(12) United States Patent
Blaha

(10) Patent No.: US 8,104,956 B2
(45) Date of Patent: Jan. 31, 2012

(54) THERMOCOUPLE MEASUREMENT CIRCUIT

(75) Inventor: Derek M. Blaha, Longmont, CO (US)

(73) Assignee: Covidien AG (CH)

( * ) Notice: Subject to any disclaimer, the term of this patent is extended or adjusted under 35 U.S.C. 154(b) by 1017 days.

(21) Appl. No.: 10/573,314

(22) PCT Filed: Oct. 23, 2003

(86) PCT No.: PCT/US03/33711
§ 371 (c)(1),
(2), (4) Date: Sep. 28, 2007

(87) PCT Pub. No.: WO2005/050151
PCT Pub. Date: Jun. 2, 2005

(65) Prior Publication Data
US 2008/0125767 A1     May 29, 2008

(51) Int. Cl.
*G01K 7/00* (2006.01)
*A61B 5/01* (2006.01)
(52) U.S. Cl. ............. 374/181; 600/549; 606/31; 606/41
(58) Field of Classification Search .................. 606/31, 606/34, 41, 48–50; 600/549; 607/102; 374/181
See application file for complete search history.

(56) References Cited

U.S. PATENT DOCUMENTS

| | | |
|---|---|---|
| 1,787,709 A | 1/1931 | Wappler |
| 1,813,902 A | 7/1931 | Bovie |
| 1,841,968 A | 1/1932 | Lowry |
| 1,863,118 A | 6/1932 | Liebel |
| 1,945,867 A | 2/1934 | Rawls |
| 2,827,056 A | 3/1958 | Degelman |
| 2,849,611 A | 8/1958 | Adams |
| 2,982,881 A | 5/1961 | Reich |
| 3,058,470 A | 10/1962 | Seeliger et al. |
| 3,089,496 A | 5/1963 | Degelman |
| 3,163,165 A | 12/1964 | Islikawa |
| 3,252,052 A | 5/1966 | Nash |
| 3,391,351 A | 7/1968 | Trent |
| 3,402,326 A | 9/1968 | Guasco et al. |
| 3,413,480 A | 11/1968 | Biard et al. |
| 3,436,563 A | 4/1969 | Regitz |

(Continued)

FOREIGN PATENT DOCUMENTS

DE        179607        3/1905

(Continued)

OTHER PUBLICATIONS

Alexander et al., "Magnetic Resonance Image-Directed Stereotactic Neurosurgery: Use of Image Fusion with Computerized Tomography to Enhance Spatial Accuracy" Journal Neurosurgery, 83; (1995) pp. 271-276.

(Continued)

*Primary Examiner* — Michael Peffley

(57) ABSTRACT

A thermocouple measuring circuit for sensing a temperature at a measuring point is provided. The thermocouple measurement circuit (12) includes a thermocouple input for sensing a temperature at a measuring point, a compensation circuit (14) for compensating thermocouple effects of junctions of the thermocouple, and an instrumentation amplifier (16) for summing an output of the thermocouple and an output of the compensation circuit and outputting a voltage indicative of the temperature sensed, wherein the output of the compensation circuit is a reference voltage for the output of the instrumentation amplifier. Various embodiments of the thermocouple measurement circuit may be employed in electrosurgical generators for controlling output power dependent on temperature conditions.

14 Claims, 4 Drawing Sheets

U.S. PATENT DOCUMENTS

| | | |
|---|---|---|
| 3,439,253 A | 4/1969 | Piteo |
| 3,439,680 A | 4/1969 | Thomas, Jr. |
| 3,461,874 A | 8/1969 | Martinez |
| 3,471,770 A | 10/1969 | Haire |
| 3,478,744 A | 11/1969 | Leiter |
| 3,486,115 A | 12/1969 | Anderson |
| 3,495,584 A | 2/1970 | Schwalm |
| 3,513,353 A | 5/1970 | Lansch |
| 3,514,689 A | 5/1970 | Giannamore |
| 3,515,943 A | 6/1970 | Warrington |
| 3,551,786 A | 12/1970 | Van Gulik |
| 3,562,623 A | 2/1971 | Farnsworth |
| 3,571,644 A | 3/1971 | Jakoubovitch |
| 3,589,363 A | 6/1971 | Banko |
| 3,595,221 A | 7/1971 | Blackett |
| 3,601,126 A | 8/1971 | Estes |
| 3,611,053 A | 10/1971 | Rowell |
| 3,641,422 A | 2/1972 | Farnsworth et al. |
| 3,642,008 A | 2/1972 | Bolduc |
| 3,662,151 A | 5/1972 | Haffey |
| 3,675,655 A | 7/1972 | Sittner |
| 3,683,923 A | 8/1972 | Anderson |
| 3,693,613 A | 9/1972 | Kelman |
| 3,697,808 A | 10/1972 | Lee |
| 3,699,967 A | 10/1972 | Anderson |
| 3,720,896 A | 3/1973 | Beierlein |
| 3,743,918 A | 7/1973 | Maitre |
| 3,766,434 A | 10/1973 | Sherman |
| 3,768,482 A | 10/1973 | Shaw |
| 3,783,340 A | 1/1974 | Becker |
| 3,784,842 A | 1/1974 | Kremer |
| 3,801,766 A | 4/1974 | Morrison, Jr. |
| 3,801,800 A | 4/1974 | Newton |
| 3,812,858 A | 5/1974 | Oringer |
| 3,815,015 A | 6/1974 | Swin et al. |
| 3,826,263 A | 7/1974 | Cage et al. |
| 3,828,768 A | 8/1974 | Douglas |
| 3,848,600 A | 11/1974 | Patrick, Jr. et al. |
| 3,870,047 A | 3/1975 | Gonser |
| 3,875,945 A | 4/1975 | Friedman |
| 3,885,569 A | 5/1975 | Judson |
| 3,897,787 A | 8/1975 | Ikuno et al. |
| 3,897,788 A | 8/1975 | Newton |
| 3,898,554 A | 8/1975 | Knudsen |
| 3,901,216 A | 8/1975 | Felger |
| 3,905,373 A | 9/1975 | Gonser |
| 3,913,583 A | 10/1975 | Bross |
| 3,923,063 A | 12/1975 | Andrews et al. |
| 3,933,157 A | 1/1976 | Bjurwill et al. |
| 3,946,738 A | 3/1976 | Newton et al. |
| 3,952,748 A | 4/1976 | Kaliher et al. |
| 3,963,030 A | 6/1976 | Newton |
| 3,964,487 A | 6/1976 | Judson |
| 3,971,365 A | 7/1976 | Smith |
| 3,978,393 A | 8/1976 | Wisner et al. |
| 3,980,085 A | 9/1976 | Ikuno |
| 4,005,714 A | 2/1977 | Hiltebrandt |
| 4,024,467 A | 5/1977 | Andrews et al. |
| 4,041,952 A | 8/1977 | Morrison, Jr. et al. |
| 4,051,855 A | 10/1977 | Schneiderman |
| 4,063,557 A | 12/1977 | Wuchinich et al. |
| 4,074,719 A | 2/1978 | Semm |
| 4,092,986 A | 6/1978 | Schneiderman |
| 4,094,320 A | 6/1978 | Newton et al. |
| 4,097,773 A | 6/1978 | Lindmark |
| 4,102,341 A | 7/1978 | Ikuno et al. |
| 4,114,623 A | 9/1978 | Meinke et al. |
| 4,121,590 A | 10/1978 | Gonser |
| 4,123,673 A | 10/1978 | Gonser |
| 4,126,137 A | 11/1978 | Archibald |
| 4,145,636 A | 3/1979 | Doi |
| 4,171,700 A | 10/1979 | Farin |
| 4,188,927 A | 2/1980 | Harris |
| 4,191,188 A | 3/1980 | Belt et al. |
| 4,196,734 A | 4/1980 | Harris |
| 4,200,104 A | 4/1980 | Harris |
| 4,200,105 A | 4/1980 | Gonser |
| 4,209,018 A | 6/1980 | Meinke et al. |
| 4,231,372 A | 11/1980 | Newton |
| 4,232,676 A | 11/1980 | Herczog |
| 4,237,887 A | 12/1980 | Gonser |
| 4,237,891 A | 12/1980 | DuBose et al. |
| 4,281,373 A | 7/1981 | Mabille |
| 4,287,557 A | 9/1981 | Brehse |
| 4,303,073 A | 12/1981 | Archibald |
| 4,311,154 A | 1/1982 | Sterzer et al. |
| 4,314,559 A | 2/1982 | Allen |
| 4,321,926 A | 3/1982 | Roge |
| 4,334,539 A | 6/1982 | Childs et al. |
| 4,343,308 A | 8/1982 | Gross |
| 4,372,315 A | 2/1983 | Shapiro et al. |
| 4,376,263 A | 3/1983 | Pittroff et al. |
| 4,378,801 A | 4/1983 | Oosten |
| 4,384,582 A | 5/1983 | Watt |
| 4,397,314 A | 8/1983 | Vaguine |
| 4,407,272 A | 10/1983 | Yamaguchi |
| 4,411,266 A | 10/1983 | Cosman |
| 4,416,276 A | 11/1983 | Newton et al. |
| 4,416,277 A | 11/1983 | Newton et al. |
| 4,429,694 A | 2/1984 | McGreevy |
| 4,436,091 A | 3/1984 | Banko |
| 4,437,464 A | 3/1984 | Crow |
| 4,438,766 A | 3/1984 | Bowers |
| 4,452,546 A | 6/1984 | Hiltebrandt et al. |
| 4,463,759 A | 8/1984 | Garito et al. |
| 4,470,414 A | 9/1984 | Imagawa et al. |
| 4,472,661 A | 9/1984 | Culver |
| 4,474,179 A | 10/1984 | Koch |
| 4,492,231 A | 1/1985 | Auth |
| 4,492,832 A | 1/1985 | Taylor |
| 4,494,541 A | 1/1985 | Archibald |
| 4,514,619 A | 4/1985 | Kugelman |
| 4,520,818 A | 6/1985 | Mickiewicz |
| 4,559,496 A | 12/1985 | Harnden, Jr. et al. |
| 4,559,943 A | 12/1985 | Bowers |
| 4,565,200 A | 1/1986 | Cosman |
| 4,566,454 A | 1/1986 | Mehl et al. |
| 4,569,345 A | 2/1986 | Manes |
| 4,576,177 A | 3/1986 | Webster, Jr. |
| 4,582,057 A | 4/1986 | Auth et al. |
| 4,586,120 A | 4/1986 | Malik et al. |
| 4,590,934 A | 5/1986 | Malis et al. |
| 4,608,977 A | 9/1986 | Brown |
| 4,615,330 A | 10/1986 | Nagasaki et al. |
| 4,630,218 A | 12/1986 | Hurley |
| 4,632,109 A | 12/1986 | Patterson |
| 4,644,955 A | 2/1987 | Mioduski |
| 4,646,222 A | 2/1987 | Okado et al. |
| 4,651,264 A | 3/1987 | Hu |
| 4,651,280 A | 3/1987 | Chang et al. |
| 4,657,015 A | 4/1987 | Irnich |
| 4,658,815 A | 4/1987 | Farin et al. |
| 4,658,819 A | 4/1987 | Harris et al. |
| 4,658,820 A | 4/1987 | Klicek |
| 4,662,383 A | 5/1987 | Sogawa et al. |
| 4,691,703 A | 9/1987 | Auth et al. |
| 4,712,559 A | 12/1987 | Turner |
| 4,727,874 A | 3/1988 | Bowers et al. |
| 4,735,204 A | 4/1988 | Sussman et al. |
| 4,739,759 A | 4/1988 | Rexroth et al. |
| 4,741,334 A | 5/1988 | Irnich |
| 4,754,757 A | 7/1988 | Feucht |
| 4,788,634 A | 11/1988 | Schlecht et al. |
| 4,805,621 A | 2/1989 | Heinze et al. |
| 4,818,954 A | 4/1989 | Flachenecker et al. |
| 4,827,911 A | 5/1989 | Broadwin et al. |
| 4,827,927 A | 5/1989 | Newton |
| 4,832,024 A | 5/1989 | Boussignac et al. |
| 4,848,335 A | 7/1989 | Manes |
| 4,848,355 A | 7/1989 | Nakamura et al. |
| 4,860,745 A | 8/1989 | Farin et al. |
| 4,862,889 A | 9/1989 | Feucht |
| 4,880,719 A | 11/1989 | Murofushi et al. |
| 4,887,199 A | 12/1989 | Whittle |
| 4,890,610 A | 1/1990 | Kirwan et al. |
| 4,903,696 A | 2/1990 | Stasz et al. |
| 4,907,589 A | 3/1990 | Cosman |

| Patent | Date | Inventor |
|---|---|---|
| 4,922,210 A | 5/1990 | Flachenecker et al. |
| 4,931,047 A | 6/1990 | Broadwin et al. |
| 4,931,717 A | 6/1990 | Gray et al. |
| 4,938,761 A | 7/1990 | Ensslin |
| 4,942,313 A | 7/1990 | Kinzel |
| 4,959,606 A | 9/1990 | Forge |
| 4,961,047 A | 10/1990 | Carder |
| 4,961,435 A | 10/1990 | Kitagawa et al. |
| 4,966,597 A | 10/1990 | Cosman |
| RE33,420 E | 11/1990 | Sussman |
| 4,969,885 A | 11/1990 | Farin |
| 4,992,719 A | 2/1991 | Harvey |
| 4,993,430 A | 2/1991 | Shimoyama et al. |
| 4,995,877 A | 2/1991 | Ams et al. |
| 5,015,227 A | 5/1991 | Broadwin et al. |
| 5,019,176 A | 5/1991 | Brandhorst, Jr. |
| 5,024,668 A | 6/1991 | Peters et al. |
| 5,029,588 A | 7/1991 | Yock et al. |
| 5,057,105 A * | 10/1991 | Malone et al. .................. 606/28 |
| 5,087,257 A | 2/1992 | Farin |
| 5,099,840 A | 3/1992 | Goble et al. |
| 5,103,804 A | 4/1992 | Abele et al. |
| 5,108,389 A | 4/1992 | Cosmescu |
| 5,108,391 A | 4/1992 | Flachenecker |
| 5,122,137 A | 6/1992 | Lennox |
| 5,133,711 A | 7/1992 | Hagen |
| 5,151,102 A | 9/1992 | Kamiyama et al. |
| 5,152,762 A | 10/1992 | McElhenney |
| 5,157,603 A | 10/1992 | Scheller et al. |
| 5,160,334 A | 11/1992 | Billings et al. |
| 5,161,893 A | 11/1992 | Beran et al. |
| 5,162,217 A | 11/1992 | Hartman |
| 5,167,658 A | 12/1992 | Ensslin |
| 5,190,517 A | 3/1993 | Zieve et al. |
| 5,196,008 A | 3/1993 | Kuenecke |
| 5,196,009 A | 3/1993 | Kirwan, Jr. |
| 5,201,900 A | 4/1993 | Nardella |
| 5,207,691 A | 5/1993 | Nardella |
| 5,230,623 A | 7/1993 | Guthrie et al. |
| 5,233,515 A | 8/1993 | Cosman |
| 5,249,121 A | 9/1993 | Baum et al. |
| 5,254,117 A | 10/1993 | Rigby et al. |
| RE34,432 E | 11/1993 | Bertrand |
| 5,267,994 A | 12/1993 | Gentelia et al. |
| 5,267,997 A | 12/1993 | Farin |
| 5,281,213 A | 1/1994 | Milder et al. |
| 5,300,068 A | 4/1994 | Rosar et al. |
| 5,300,070 A | 4/1994 | Gentelia |
| 5,318,563 A | 6/1994 | Malis et al. |
| 5,323,778 A | 6/1994 | Kandarpa et al. |
| 5,324,283 A | 6/1994 | Heckele |
| 5,330,518 A | 7/1994 | Neilson et al. |
| 5,334,183 A | 8/1994 | Wuchinich |
| 5,334,193 A | 8/1994 | Nardella |
| 5,341,807 A | 8/1994 | Nardella |
| 5,342,356 A | 8/1994 | Ellman |
| 5,342,357 A | 8/1994 | Nardella |
| 5,342,409 A | 8/1994 | Mullett |
| 5,348,554 A | 9/1994 | Imran et al. |
| 5,370,645 A | 12/1994 | Klicek et al. |
| 5,370,672 A | 12/1994 | Fowler et al. |
| 5,370,675 A | 12/1994 | Edwards et al. |
| 5,372,596 A | 12/1994 | Klicek et al. |
| 5,383,874 A | 1/1995 | Jackson |
| 5,383,876 A | 1/1995 | Nardella |
| 5,383,917 A | 1/1995 | Desai et al. |
| 5,385,148 A | 1/1995 | Lesh et al. |
| 5,396,062 A | 3/1995 | Eisentraut et al. |
| 5,400,267 A | 3/1995 | Denen et al. |
| 5,403,311 A | 4/1995 | Abele et al. |
| 5,403,312 A | 4/1995 | Yates et al. |
| 5,409,000 A | 4/1995 | Imran |
| 5,409,006 A | 4/1995 | Buchholtz et al. |
| 5,409,485 A | 4/1995 | Suda |
| 5,413,573 A | 5/1995 | Koivukangas |
| 5,414,238 A | 5/1995 | Steigerwald et al. |
| 5,417,719 A | 5/1995 | Hull et al. |
| 5,422,567 A | 6/1995 | Matsunaga |
| 5,423,808 A | 6/1995 | Edwards et al. |
| 5,423,809 A | 6/1995 | Klicek |
| 5,423,810 A | 6/1995 | Goble et al. |
| 5,425,704 A | 6/1995 | Sakurai et al. |
| 5,430,434 A | 7/1995 | Lederer et al. |
| 5,432,459 A | 7/1995 | Thompson |
| 5,433,739 A | 7/1995 | Sluijter et al. |
| 5,434,398 A | 7/1995 | Goldberg |
| 5,436,566 A | 7/1995 | Thompson |
| 5,438,302 A | 8/1995 | Goble |
| 5,443,463 A | 8/1995 | Stern et al. |
| 5,445,635 A | 8/1995 | Denen |
| 5,451,224 A | 9/1995 | Goble et al. |
| 5,458,597 A | 10/1995 | Edwards et al. |
| 5,462,521 A | 10/1995 | Brucker et al. |
| 5,472,441 A | 12/1995 | Edwards et al. |
| 5,472,443 A | 12/1995 | Cordis et al. |
| 5,478,303 A | 12/1995 | Folry-Nolan et al. |
| 5,480,399 A | 1/1996 | Hebborn |
| 5,483,952 A | 1/1996 | Aranyi |
| 5,490,850 A | 2/1996 | Ellman et al. |
| 5,496,312 A | 3/1996 | Klicek |
| 5,496,313 A | 3/1996 | Gentelia et al. |
| 5,498,261 A * | 3/1996 | Strul ................................ 606/29 |
| 5,500,012 A | 3/1996 | Brucker et al. |
| 5,500,616 A | 3/1996 | Ochi |
| 5,514,129 A | 5/1996 | Smith |
| 5,520,684 A | 5/1996 | Imran |
| 5,531,774 A | 7/1996 | Schulman et al. |
| 5,534,018 A | 7/1996 | Wahlstrand et al. |
| 5,536,267 A | 7/1996 | Edwards et al. |
| 5,540,681 A | 7/1996 | Strul et al. |
| 5,540,683 A | 7/1996 | Ichikawa |
| 5,540,684 A | 7/1996 | Hassler, Jr. |
| 5,540,724 A | 7/1996 | Cox |
| 5,556,396 A | 9/1996 | Cohen et al. |
| 5,558,671 A | 9/1996 | Yates |
| 5,569,242 A | 10/1996 | Lax et al. |
| 5,571,147 A | 11/1996 | Sluijter et al. |
| 5,573,533 A | 11/1996 | Strul |
| 5,584,830 A | 12/1996 | Ladd et al. |
| 5,588,432 A | 12/1996 | Crowley |
| 5,594,636 A | 1/1997 | Schauder |
| 5,596,466 A | 1/1997 | Ochi |
| 5,596,995 A * | 1/1997 | Sherman et al. ............... 600/549 |
| 5,599,344 A | 2/1997 | Paterson |
| 5,599,345 A | 2/1997 | Edwards et al. |
| 5,599,348 A | 2/1997 | Gentelia et al. |
| 5,605,150 A | 2/1997 | Radons et al. |
| 5,613,966 A | 3/1997 | Makower et al. |
| 5,613,996 A | 3/1997 | Lindsay |
| 5,625,370 A | 4/1997 | D'Hont |
| 5,626,575 A | 5/1997 | Crenner |
| 5,628,745 A | 5/1997 | Bek |
| 5,643,330 A | 7/1997 | Holsheimer et al. |
| 5,647,869 A | 7/1997 | Goble et al. |
| 5,647,871 A | 7/1997 | Levine et al. |
| 5,651,780 A | 7/1997 | Jackson et al. |
| 5,658,322 A | 8/1997 | Fleming |
| 5,660,567 A | 8/1997 | Nierlich et al. |
| 5,674,217 A | 10/1997 | Wahlstrom et al. |
| 5,685,840 A | 11/1997 | Schechter et al. |
| 5,688,267 A | 11/1997 | Panescu et al. |
| 5,690,692 A | 11/1997 | Fleming |
| 5,693,042 A | 12/1997 | Boiarski et al. |
| 5,694,304 A | 12/1997 | Telefus et al. |
| 5,695,494 A | 12/1997 | Becker |
| 5,696,351 A | 12/1997 | Benn et al. |
| 5,696,441 A | 12/1997 | Mak et al. |
| 5,702,386 A | 12/1997 | Stern et al. |
| 5,702,429 A | 12/1997 | King |
| 5,707,369 A | 1/1998 | Vaitekunas et al. |
| 5,712,772 A | 1/1998 | Telefus et al. |
| 5,713,896 A | 2/1998 | Nardella |
| 5,718,246 A | 2/1998 | Vona |
| 5,720,744 A | 2/1998 | Eggleston et al. |
| 5,722,975 A | 3/1998 | Edwards et al. |
| 5,729,448 A | 3/1998 | Haynie et al. |
| 5,733,281 A | 3/1998 | Nardella |
| 5,749,869 A | 5/1998 | Lindenmeier et al. |

| | | | | | | |
|---|---|---|---|---|---|---|
| 5,749,871 | A | 5/1998 | Hood et al. | 6,258,085 B1 | 7/2001 | Eggleston |
| 5,755,715 | A | 5/1998 | Stern | 6,261,285 B1 | 7/2001 | Novak |
| 5,766,165 | A | 6/1998 | Gentelia et al. | 6,261,286 B1 | 7/2001 | Goble et al. |
| 5,769,847 | A | 6/1998 | Panescu | 6,273,886 B1 | 8/2001 | Edwards |
| 5,772,659 | A | 6/1998 | Becker et al. | 6,275,786 B1 | 8/2001 | Daners |
| 5,792,138 | A | 8/1998 | Shipp | 6,293,941 B1 | 9/2001 | Strul |
| 5,797,802 | A | 8/1998 | Nowak | 6,293,942 B1 | 9/2001 | Goble et al. |
| 5,797,902 | A | 8/1998 | Netherly | 6,296,636 B1 | 10/2001 | Cheng et al. |
| 5,814,092 | A | 9/1998 | King | 6,306,131 B1 | 10/2001 | Hareyama et al. |
| 5,817,093 | A | 10/1998 | Williamson, IV et al. | 6,306,134 B1 | 10/2001 | Goble et al. |
| 5,820,568 | A | 10/1998 | Willis | 6,309,386 B1 | 10/2001 | Bek |
| 5,827,271 | A | 10/1998 | Buysse et al. | 6,325,799 B1 | 12/2001 | Goble |
| 5,830,212 | A | 11/1998 | Cartmell | 6,337,998 B1 | 1/2002 | Behl et al. |
| 5,836,909 | A | 11/1998 | Cosmescu | 6,338,657 B1 | 1/2002 | Harper et al. |
| 5,836,943 | A | 11/1998 | Miller, III | 6,350,262 B1 | 2/2002 | Ashley |
| 5,836,990 | A | 11/1998 | Li | 6,358,245 B1 | 3/2002 | Edwards |
| 5,846,236 | A | 12/1998 | Lindenmeier et al. | 6,364,877 B1 | 4/2002 | Goble et al. |
| 5,868,737 | A | 2/1999 | Taylor et al. | 6,383,183 B1 | 5/2002 | Sekino et al. |
| 5,868,739 | A | 2/1999 | Lindenmeier et al. | 6,391,024 B1 | 5/2002 | Sun et al. |
| 5,868,740 | A | 2/1999 | LeVeen et al. | 6,398,779 B1 | 6/2002 | Buysse et al. |
| 5,871,481 | A | 2/1999 | Kannenberg et al. | 6,398,781 B1 | 6/2002 | Goble et al. |
| 5,897,552 | A | 4/1999 | Edwards et al. | 6,402,741 B1 | 6/2002 | Keppel et al. |
| 5,908,444 | A | 6/1999 | Azure | 6,402,743 B1 | 6/2002 | Orszulak et al. |
| 5,913,882 | A | 6/1999 | King | 6,416,509 B1 | 7/2002 | Goble et al. |
| 5,921,982 | A | 7/1999 | Lesh et al. | 6,436,096 B1 | 8/2002 | Hareyama |
| 5,925,070 | A | 7/1999 | King et al. | 6,451,015 B1 | 9/2002 | Rittman, III et al. |
| 5,931,836 | A | 8/1999 | Hatta et al. | 6,458,121 B1 | 10/2002 | Rosenstock |
| 5,938,690 | A | 8/1999 | Law et al. | 6,464,689 B1 | 10/2002 | Qin |
| 5,948,007 | A | 9/1999 | Starkebaum et al. | 6,464,696 B1 | 10/2002 | Oyama |
| 5,951,545 | A | 9/1999 | Schilling | 6,494,880 B1 | 12/2002 | Panescu et al. |
| 5,951,546 | A | 9/1999 | Lorentzen | 6,498,466 B1 | 12/2002 | Edwards |
| 5,954,686 | A | 9/1999 | Garito et al. | 6,506,189 B1 | 1/2003 | Rittman, III et al. |
| 5,954,717 | A | 9/1999 | Behl et al. | 6,508,815 B1 | 1/2003 | Strul |
| 5,954,719 | A | 9/1999 | Chen et al. | 6,511,476 B2 | 1/2003 | Hareyama |
| 5,961,344 | A | 10/1999 | Rosales et al. | 6,511,478 B1 | 1/2003 | Burnside et al. |
| 5,971,980 | A | 10/1999 | Sherman | 6,517,538 B1 | 2/2003 | Jacob et al. |
| 5,976,128 | A | 11/1999 | Schilling et al. | 6,524,308 B1 | 2/2003 | Muller et al. |
| 5,983,141 | A | 11/1999 | Sluijter et al. | 6,547,786 B1 | 4/2003 | Goble |
| 6,010,499 | A | 1/2000 | Cobb | 6,558,376 B2 | 5/2003 | Bishop |
| 6,014,581 | A | 1/2000 | Whayne et al. | 6,560,470 B1 | 5/2003 | Pologe |
| 6,033,399 | A | 3/2000 | Gines | 6,562,037 B2 | 5/2003 | Paton |
| 6,044,283 | A | 3/2000 | Fein et al. | 6,565,559 B2 | 5/2003 | Eggleston |
| 6,053,910 | A | 4/2000 | Fleenor | 6,573,248 B2 | 6/2003 | Ramasamy et al. |
| 6,053,912 | A | 4/2000 | Panescu et al. | 6,575,969 B1 | 6/2003 | Rittman, III et al. |
| 6,055,458 | A | 4/2000 | Cochran et al. | 6,582,427 B1 | 6/2003 | Goble et al. |
| 6,056,745 | A | 5/2000 | Panescu et al. | 6,620,157 B1 | 9/2003 | Dabney et al. |
| 6,056,746 | A | 5/2000 | Goble et al. | 6,623,423 B2 | 9/2003 | Ozaki et al. |
| 6,063,075 | A | 5/2000 | Mihori | 6,629,973 B1 | 10/2003 | Wardell et al. |
| 6,063,078 | A | 5/2000 | Wittkampf | 6,629,974 B2 * | 10/2003 | Penny et al. .................. 606/41 |
| 6,068,627 | A | 5/2000 | Orszulak et al. | 6,635,057 B2 | 10/2003 | Harano |
| 6,074,089 | A * | 6/2000 | Hollander et al. ............ 374/181 | 6,645,198 B1 | 11/2003 | Bommannan et al. |
| 6,074,386 | A | 6/2000 | Goble et al. | 6,648,883 B2 | 11/2003 | Francischelli |
| 6,074,388 | A | 6/2000 | Tockweiler et al. | 6,652,514 B2 | 11/2003 | Ellman |
| 6,080,149 | A | 6/2000 | Huang et al. | 6,663,623 B1 | 12/2003 | Oyama et al. |
| 6,093,186 | A | 7/2000 | Goble | 6,663,624 B2 | 12/2003 | Edwards |
| 6,102,497 | A | 8/2000 | Ehr et al. | 6,666,860 B1 | 12/2003 | Takahashi |
| RE36,871 | E | 9/2000 | Epstein | 6,679,875 B2 | 1/2004 | Honda |
| 6,113,591 | A | 9/2000 | Whayne et al. | 6,682,527 B2 | 1/2004 | Strul |
| 6,113,596 | A | 9/2000 | Hooven | 6,685,700 B2 | 2/2004 | Behl |
| 6,123,702 | A | 9/2000 | Swanson et al. | 6,685,701 B2 | 2/2004 | Orszulak et al. |
| 6,132,429 | A | 10/2000 | Baker | 6,685,703 B2 | 2/2004 | Pearson et al. |
| 6,142,992 | A | 11/2000 | Cheng et al. | 6,689,131 B2 | 2/2004 | McClurken |
| 6,155,975 | A | 12/2000 | Urich et al. | 6,692,489 B1 | 2/2004 | Heim |
| 6,162,217 | A | 12/2000 | Kannenberg et al. | 6,693,782 B1 | 2/2004 | Lash |
| 6,171,304 | B1 | 1/2001 | Netherly et al. | 6,712,813 B2 | 3/2004 | Ellman |
| 6,188,211 | B1 | 2/2001 | Rincon-Mora et al. | 6,730,080 B2 | 5/2004 | Harano |
| 6,203,541 | B1 | 3/2001 | Keppel | 6,733,495 B1 | 5/2004 | Bek |
| 6,210,403 | B1 | 4/2001 | Klicek | 6,733,498 B2 | 5/2004 | Paton |
| 6,222,356 | B1 | 4/2001 | Taghizadeh-Kaschani | 6,740,079 B1 | 5/2004 | Eggers |
| 6,228,080 | B1 | 5/2001 | Gines | 6,740,085 B2 | 5/2004 | Hareyama |
| 6,228,081 | B1 | 5/2001 | Goble | 6,755,825 B2 | 6/2004 | Shoenman et al. |
| 6,231,569 | B1 | 5/2001 | Bek | 6,758,846 B2 | 7/2004 | Goble et al. |
| 6,235,020 | B1 | 5/2001 | Cheng et al. | 6,783,523 B2 | 8/2004 | Qin |
| 6,238,387 | B1 | 5/2001 | Miller, III | 6,786,905 B2 | 9/2004 | Swanson et al. |
| 6,238,388 | B1 | 5/2001 | Ellman | 6,790,206 B2 | 9/2004 | Panescu |
| 6,241,725 | B1 | 6/2001 | Cosman | 6,796,981 B2 | 9/2004 | Wham |
| 6,245,065 | B1 | 6/2001 | Panescu | 6,824,539 B2 | 11/2004 | Novak |
| 6,246,912 | B1 | 6/2001 | Sluijter et al. | 6,830,569 B2 | 12/2004 | Thompson |
| 6,251,106 | B1 | 6/2001 | Becker et al. | 6,843,789 B2 | 1/2005 | Goble |

| | | |
|---|---|---|
| 6,849,073 B2 | 2/2005 | Hoey |
| 6,855,141 B2 | 2/2005 | Lovewell |
| 6,855,142 B2 | 2/2005 | Harano |
| 6,860,881 B2 | 3/2005 | Sturm |
| 6,864,686 B2 | 3/2005 | Novak |
| 6,875,210 B2 | 4/2005 | Refior |
| 6,893,435 B2 | 5/2005 | Goble |
| 6,923,804 B2 | 8/2005 | Eggers et al. |
| 6,929,641 B2 | 8/2005 | Goble et al. |
| 6,939,346 B2 | 9/2005 | Kannenberg et al. |
| 6,939,347 B2 | 9/2005 | Thompson |
| 6,942,660 B2 | 9/2005 | Pantera et al. |
| 6,948,503 B2 | 9/2005 | Refior et al. |
| 6,966,907 B2 | 11/2005 | Goble |
| 6,989,010 B2 | 1/2006 | Francischelli et al. |
| 6,994,704 B2 | 2/2006 | Qin et al. |
| 6,994,707 B2 | 2/2006 | Ellman et al. |
| 7,001,381 B2 | 2/2006 | Harano et al. |
| 7,004,174 B2 | 2/2006 | Eggers et al. |
| 7,041,096 B2 | 5/2006 | Malis et al. |
| 7,044,948 B2 | 5/2006 | Keppel |
| 7,044,949 B2 | 5/2006 | Orszulak et al. |
| 7,060,063 B2 | 6/2006 | Marion et al. |
| 7,062,331 B2 | 6/2006 | Zarinetchi et al. |
| 7,063,692 B2 | 6/2006 | Sakurai et al. |
| 7,066,933 B2 | 6/2006 | Hagg |
| 7,122,031 B2 | 10/2006 | Edwards et al. |
| 7,131,860 B2 | 11/2006 | Sartor et al. |
| 7,137,980 B2 | 11/2006 | Buysse et al. |
| 7,147,638 B2 | 12/2006 | Chapman et al. |
| 7,160,293 B2 | 1/2007 | Sturm et al. |
| 7,172,591 B2 | 2/2007 | Harano et al. |
| 7,175,618 B2 | 2/2007 | Dabney et al. |
| 7,175,621 B2 | 2/2007 | Heim et al. |
| 7,211,081 B2 | 5/2007 | Goble |
| 7,214,224 B2 | 5/2007 | Goble |
| 7,220,260 B2 | 5/2007 | Fleming et al. |
| 7,247,155 B2 | 7/2007 | Hoey et al. |
| 7,250,746 B2 | 7/2007 | Oswald et al. |
| 7,255,694 B2 | 8/2007 | Keppel |
| 7,282,048 B2 | 10/2007 | Goble et al. |
| 7,300,435 B2 | 11/2007 | Wham et al. |
| 7,303,557 B2 | 12/2007 | Wham et al. |
| 7,364,577 B2 | 4/2008 | Wham et al. |
| 7,367,972 B2 | 5/2008 | Francischelli et al. |
| RE40,388 E | 6/2008 | Gines |
| 7,396,336 B2 | 7/2008 | Orszulak et al. |
| 2001/0014804 A1 | 8/2001 | Goble et al. |
| 2001/0029315 A1 | 10/2001 | Sakurai et al. |
| 2001/0031962 A1 | 10/2001 | Eggleston |
| 2002/0035363 A1 | 3/2002 | Edwards et al. |
| 2002/0035364 A1 | 3/2002 | Schoenman et al. |
| 2002/0052599 A1 | 5/2002 | Goble |
| 2002/0068932 A1 | 6/2002 | Edwards |
| 2002/0107517 A1 | 8/2002 | Witt et al. |
| 2002/0111624 A1 | 8/2002 | Witt et al. |
| 2002/0151889 A1 | 10/2002 | Swanson et al. |
| 2002/0193787 A1 | 12/2002 | Qin |
| 2003/0004510 A1 | 1/2003 | Wham et al. |
| 2003/0060818 A1 | 3/2003 | Kannenberg |
| 2003/0078572 A1 | 4/2003 | Pearson et al. |
| 2003/0139741 A1 | 7/2003 | Goble et al. |
| 2003/0153908 A1 | 8/2003 | Goble |
| 2003/0163123 A1 | 8/2003 | Goble |
| 2003/0163124 A1 | 8/2003 | Goble |
| 2003/0171745 A1 | 9/2003 | Francischelli |
| 2003/0181898 A1 | 9/2003 | Bowers |
| 2003/0199863 A1 | 10/2003 | Swanson |
| 2003/0225401 A1 | 12/2003 | Eggers et al. |
| 2004/0002745 A1 | 1/2004 | Flemming |
| 2004/0015159 A1 | 1/2004 | Slater et al. |
| 2004/0015163 A1 | 1/2004 | Buysse et al. |
| 2004/0015216 A1 | 1/2004 | DeSisto |
| 2004/0019347 A1 | 1/2004 | Sakurai |
| 2004/0024395 A1 | 2/2004 | Ellman |
| 2004/0030328 A1 | 2/2004 | Eggers |
| 2004/0030330 A1 | 2/2004 | Brassell et al. |
| 2004/0044339 A1 | 3/2004 | Beller |
| 2004/0049179 A1 | 3/2004 | Francischelli |
| 2004/0054365 A1 | 3/2004 | Goble |
| 2004/0059323 A1 | 3/2004 | Sturm et al. |
| 2004/0068304 A1 | 4/2004 | Paton |
| 2004/0082946 A1 | 4/2004 | Malis |
| 2004/0095100 A1 | 5/2004 | Thompson |
| 2004/0097912 A1 | 5/2004 | Gonnering |
| 2004/0097914 A1 | 5/2004 | Pantera |
| 2004/0097915 A1 | 5/2004 | Refior |
| 2004/0116919 A1 | 6/2004 | Heim |
| 2004/0133189 A1 | 7/2004 | Sakurai |
| 2004/0138653 A1 | 7/2004 | Dabney et al. |
| 2004/0138654 A1 | 7/2004 | Goble |
| 2004/0143263 A1 | 7/2004 | Schechter et al. |
| 2004/0147918 A1 | 7/2004 | Keppel |
| 2004/0167508 A1 | 8/2004 | Wham et al. |
| 2004/0172016 A1 | 9/2004 | Bek |
| 2004/0193148 A1 | 9/2004 | Wham et al. |
| 2004/0230189 A1 | 11/2004 | Keppel |
| 2004/0243120 A1 | 12/2004 | Orszulak et al. |
| 2004/0260279 A1 | 12/2004 | Goble |
| 2005/0004564 A1 | 1/2005 | Wham |
| 2005/0004569 A1 | 1/2005 | Witt et al. |
| 2005/0021020 A1 | 1/2005 | Blaha et al. |
| 2005/0021022 A1 | 1/2005 | Sturm et al. |
| 2005/0101949 A1 | 5/2005 | Harano et al. |
| 2005/0101951 A1 | 5/2005 | Wham |
| 2005/0113818 A1 | 5/2005 | Sartor |
| 2005/0113819 A1 | 5/2005 | Wham |
| 2005/0149151 A1 | 7/2005 | Orszulak |
| 2005/0182398 A1 | 8/2005 | Paterson |
| 2005/0197659 A1 | 9/2005 | Bahney |
| 2005/0203504 A1 | 9/2005 | Wham et al. |
| 2006/0025760 A1 | 2/2006 | Podhajsky |
| 2006/0079871 A1 | 4/2006 | Plaven et al. |
| 2006/0161148 A1 | 7/2006 | Behnke |
| 2006/0178664 A1 | 8/2006 | Keppel |
| 2006/0224152 A1 | 10/2006 | Behnke et al. |
| 2006/0281360 A1 | 12/2006 | Sartor et al. |
| 2007/0038209 A1 | 2/2007 | Buysse et al. |
| 2007/0093800 A1 | 4/2007 | Wham et al. |
| 2007/0093801 A1 | 4/2007 | Behnke |
| 2007/0135812 A1 | 6/2007 | Sartor |
| 2007/0173802 A1 | 7/2007 | Keppel |
| 2007/0173803 A1 | 7/2007 | Wham et al. |
| 2007/0173804 A1 | 7/2007 | Wham et al. |
| 2007/0173805 A1 | 7/2007 | Weinberg et al. |
| 2007/0173806 A1 | 7/2007 | Orszulak et al. |
| 2007/0173810 A1 | 7/2007 | Orszulak |
| 2007/0173813 A1 | 7/2007 | Odom |
| 2007/0208339 A1 | 9/2007 | Arts et al. |
| 2007/0225698 A1 | 9/2007 | Orszulak et al. |
| 2007/0250052 A1 | 10/2007 | Wham |
| 2007/0265612 A1 | 11/2007 | Behnke et al. |
| 2007/0282320 A1 | 12/2007 | Buysse et al. |
| 2008/0015564 A1 | 1/2008 | Wham et al. |
| 2008/0039831 A1 | 2/2008 | Odom et al. |
| 2008/0039836 A1 | 2/2008 | Odom et al. |
| 2008/0082094 A1 | 4/2008 | McPherson et al. |
| 2008/0125767 A1 | 5/2008 | Blaha |

FOREIGN PATENT DOCUMENTS

| | | |
|---|---|---|
| DE | 1099658 | 2/1961 |
| DE | 1139927 | 11/1962 |
| DE | 1149832 | 6/1963 |
| DE | 1439302 | 1/1969 |
| DE | 2439587 | 2/1975 |
| DE | 2455174 | 5/1975 |
| DE | 2407559 | 8/1975 |
| DE | 2602517 | 7/1976 |
| DE | 2504280 | 8/1976 |
| DE | 2540968 | 3/1977 |
| DE | 2820908 | 11/1978 |
| DE | 2803275 | 8/1979 |
| DE | 2823291 | 11/1979 |
| DE | 2946728 | 5/1981 |
| DE | 3143421 | 5/1982 |
| DE | 3045996 | 7/1982 |
| DE | 3120102 | 12/1982 |
| DE | 3510586 | 10/1986 |

| | | |
|---|---|---|
| DE | 3604823 | 8/1987 |
| DE | 390937 | 4/1989 |
| DE | 3904558 | 8/1990 |
| DE | 3942998 | 7/1991 |
| DE | 4339049 A1 | 5/1995 |
| DE | 19717411 | 11/1998 |
| DE | 19848540 A1 | 5/2000 |
| EP | 246350 | 11/1987 |
| EP | 310431 | 4/1989 |
| EP | 325456 | 7/1989 |
| EP | 336742 | 10/1989 |
| EP | 390937 | 10/1990 |
| EP | 556705 | 8/1993 |
| EP | 0569130 A1 | 11/1993 |
| EP | 608609 | 8/1994 |
| EP | 0694291 | 1/1996 |
| EP | 836868 | 4/1998 |
| EP | 878169 | 11/1998 |
| EP | 1051948 | 11/2000 |
| EP | 1053720 | 11/2000 |
| EP | 1151725 | 11/2001 |
| EP | 1293171 | 3/2003 |
| EP | 1472984 | 11/2004 |
| EP | 1495712 | 1/2005 |
| EP | 1500378 | 1/2005 |
| EP | 1535581 | 6/2005 |
| EP | 1609430 | 12/2005 |
| EP | 1645235 | 4/2006 |
| EP | 0880220 B1 | 6/2006 |
| EP | 1707143 | 10/2006 |
| EP | 1810628 | 7/2007 |
| EP | 1810630 | 7/2007 |
| EP | 1810633 | 7/2007 |
| FR | 1275415 | 10/1961 |
| FR | 1347865 | 11/1963 |
| FR | 2313708 | 12/1976 |
| FR | 2502935 | 10/1982 |
| FR | 2517953 | 6/1983 |
| FR | 2573301 | 5/1986 |
| GB | 607850 | 9/1948 |
| GB | 702 510 | 1/1954 |
| GB | 855459 | 11/1960 |
| GB | 902775 | 8/1962 |
| GB | 2164473 | 3/1986 |
| GB | 2214430 | 9/1989 |
| GB | 2358934 A | 8/2001 |
| SU | 166452 | 1/1965 |
| SU | 727201 | 4/1980 |
| WO | WO92/06642 | 4/1992 |
| WO | WO93/24066 | 12/1993 |
| WO | WO94/24949 | 11/1994 |
| WO | WO94/28809 | 12/1994 |
| WO | WO95/09577 | 4/1995 |
| WO | WO95/19148 | 7/1995 |
| WO | WO96/02180 | 2/1996 |
| WO | WO96/04860 | 2/1996 |
| WO | WO96/08794 | 3/1996 |
| WO | WO96/18349 | 6/1996 |
| WO | WO96/29946 | 10/1996 |
| WO | WO96/39086 | 12/1996 |
| WO | WO96/39914 | 12/1996 |
| WO | WO97/06739 | 2/1997 |
| WO | WO97/06740 | 2/1997 |
| WO | WO97/06855 | 2/1997 |
| WO | WO97/11648 | 4/1997 |
| WO | WO97/17029 | 5/1997 |
| WO | WO02/11634 | 2/2002 |
| WO | WO02/45589 | 6/2002 |
| WO | WO02/47565 | 6/2002 |
| WO | WO02/053048 | 7/2002 |
| WO | WO02/088128 | 7/2002 |
| WO | WO03/090630 | 11/2003 |
| WO | WO03/090635 | 11/2003 |
| WO | WO03/092520 | 11/2003 |
| WO | WO2004/028385 | 4/2004 |
| WO | WO2004/098385 | 4/2004 |
| WO | WO2004/103156 | 12/2004 |
| WO | WO2005/046496 | 5/2005 |
| WO | WO2005/048809 | 6/2005 |
| WO | WO2005/050151 | 6/2005 |
| WO | WO2005048809 A1 | 6/2005 |
| WO | WO2005/060849 | 7/2005 |
| WO | WO2005/060365 | 11/2005 |

OTHER PUBLICATIONS

Anderson et al., "A Numerical Study of Rapid Heating for High Temperature Radio Frequency Hyperthermia" International Journal of Bio-Medical Computing, 35 (1994) pp. 297-307.

Astrahan, "A Localized Current Field Hyperthermia System for Use with 192-Iridium Interstitial Implants" Medical Physics, 9 (3), May/Jun. 1982.

Bergdahl et al. "Studies on Coagulation and the Development of an Automatic Computerized Bipolar Coagulator" J.Neurosurg, vol. 75, Jul. 1991, pp. 148-151.

Chicharo et al. "A Sliding Goertzel Algorith" Aug. 1996, pp. 283-297 Signal Processing, Elsevier Science Publishers B.V. Amsterdam, NL vol. 52 No. 3.

Cosman et al., "Methods of Making Nervous System Lesions" In William RH, Rengachary SS (eds): Neurosurgery, New York: McGraw-Hill, vol. 111, (1984), pp. 2490-2499.

Cosman et al., "Radiofrequency Lesion Generation and Its Effect on Tissue Impedance" Applied Neurophysiology 51: (1988) pp. 230-242.

Cosman et al., "Theoretical Aspects of Radiofrequency Lesions in the Dorsal Root Entry Zone" Neurosurgery 15:(1984) pp. 945-950.

Geddes et al., "The Measurement of Physiologic Events by Electrical Impedance" Am. J. MI, Jan. Mar. 1964, pp. 16-27.

Goldberg et al., "Tissue Ablation with Radiofrequency: Effect of Probe Size, Gauge, Duration, and Temperature on Lesion Volume" Acad Radio (1995) vol. 2, No. 5, pp. 399-404.

Medtrex Brochure "The O.R. Pro 300" 1 p. Sep. 1998.

Ogden Goertzel Alternative to the Fourier Transform: Jun. 1993 pp. 485-487 Electronics World; Reed Business Publishing, Sutton, Surrey, BG vol. 99, No. 9. 1687.

Sugita et al., "Bipolar Coagulator with Automatic Thermocontrol" J. Neurosurg., vol. 41, Dec. 1944, pp. 777-779.

Valleylab Brochure "Valleylab Electroshield Monitoring System" 2 pp. Nov. 1995.

Vallfors et al., "Automatically Controlled Bipolar Electrosoagulation-'COA-COMP'" Neurosurgical Review 7:2-3 (1984) pp. 187-190.

Wald et al., "Accidental Burns", JAMA, Aug. 16, 1971, vol. 217, No. 7, pp. 916-921.

Richard Wolf Medical Instruments Corp. Brochure, "Kleppinger Bipolar Forceps & Bipolar Generator" 3 pp. Jan. 1989.

International Search Report PCT/US03/37110 dated Jul. 25, 2005.
International Search Report PCT/US03/37310 dated Aug. 13, 2004.
International Search Report EP 04009964 dated Jul. 13, 2004.
International Search Report EP 98300964.8 dated Dec. 4, 2000.
International Search Report EP 04015981.6 dated Sep. 29, 2004.
International Search Report EP 05014156.3 dated Dec. 28, 2005.
International Search Report EP 05021944.3 dated Jan. 18, 2006.
International Search Report EP 05022350.2 dated Jan. 18, 2006.
International Search Report EP 06000708.5 dated Apr. 21, 2006.
International Search Report-Extended EP 06000708.5 dated Aug. 22, 2006.
International Search Report EP 05002769.7 dated Jun. 9, 2006.
International Search Report EP 06006717.0 dated Aug. 7, 2006.

Ni W et al: "A Signal Processing Method for the Coriolis Mass Flowmeter Based on a Normalized . . . " Journal of Applied Sciences-Yingyong Kexue Xuebao, Shanghai CN, vol. 23 No. 2;(Mar. 2005); 160-164.

International Search Report EP06022028.2 dated Feb. 5, 2007.
International Search Report EP06025700.3 dated Apr. 12, 2007.
International Search Report EP07001481.6 dated Apr. 23, 2007.
International Search Report EP07001485.7 dated May 15, 2007.
International Search Report EP07001527.6 dated May 9, 2007.
International Search Report EP07004355.9 dated May 21, 2007.

Muller et al., "Extended Left Hemicolectomy Using the LigaSure Vessel Sealing System" Innovations That Work; Sep. 1999.

International Search Report EP 07008207.8 dated Sep. 5, 2007.

International Search Report EP 07010673.7 dated Sep. 24, 2007.
International Search Report EP 06010499.9 dated Jan. 29, 2008.
International Search Report EP 07001489.9 dated Dec. 20, 2007.
International Search Report EP 07001491 dated Jun. 6, 2007.
International Search Report EP 07009322.4 dated Jan. 14, 2008.
International Search Report EP 07015601.3 dated Jan. 4, 2008.
International Search Report EP 07015602.1 dated Dec. 20, 2007.
International Search Report EP 07019174.7 dated Jan. 29, 2008.

International Search Report from Application No. PCT/US03/33711 dated Jul. 9, 2004.

Hadley, I C D et al., "Inexpensive Digital Thermometer for Measurements on Semiconductors", *International Journal of Electronics*, vol. 70, No. 6, 1155-1162 (1991).

* cited by examiner

THERMOCOUPLE MEASUREMENT CIRCUIT

BACKGROUND

1. Technical Field

The present invention is directed to a temperature measurement circuit, and, in particular, to a thermocouple measurement circuit employed in a control circuit for an electrosurgical generator.

2. Description of the Related Art

Electrosurgical generators are employed by surgeons in conjunction with an electrosurgical tool to cut, coagulate, desiccate and/or seal patient tissue. High frequency electrical energy, e.g., radio frequency (RF) energy, is produced by the electrosurgical generator and applied to the tissue by the electrosurgical tool. Both monopolar and bipolar configurations are commonly used during electrosurgical procedures.

Electrosurgical generators typically include power supply circuits, front panel interface circuits, and RF output stage circuits. Many electrical designs for electrosurgical generators are known in the field. In certain electrosurgical generator designs, the RF output stage can be adjusted to control the RMS (root mean square) output power. The methods of controlling the RF output stage may include changing the duty cycle, or changing the amplitude of the driving signal to the RF output stage. The method of controlling the RF output stage is described herein as changing an input to the RF output stage.

Electrosurgical techniques have been used to seal or fuse small diameter blood vessels, vascular bundles and tissue. In this application, two layers of tissue are grasped and clamped together while electrosurgical power is applied. By applying a unique combination of pressure, gap distance between opposing seal surfaces and controlling the electrosurgical energy, the two tissue layers are welded or fused together into a single mass with limited demarcation between tissue layers. Tissue fusion is similar to vessel sealing, except that a vessel or duct is not necessarily sealed in this process. For example, tissue fusion may be used instead of staples for surgical anastomosis. Electrosurgical power has a desiccating effect on tissue during tissue fusion or vessel sealing.

One of the issues associated with electrosurgical sealing or fusion of tissue is undesirable collateral damage to tissue due to the various thermal effects associated with electrosurgically energizing tissue. The tissue at the operative site is heated by electrosurgical current typically applied by the electrosurgical instrument. Healthy tissue adjacent to the operative site may become thermally damaged if too much heat is allowed to build up at the operative site or adjacent the sealing surfaces. For example, during sealing, the heat may conduct or spread to the adjacent tissue and cause a significant region of tissue necrosis. This is known as thermal spread. Thermal spread becomes important when electrosurgical instruments are used in close proximity to delicate anatomical structures. Therefore, an electrosurgical generator that reduced the possibility of thermal spread would offer a better opportunity for a successful surgical outcome.

Another issue associated with electrosurgical tissue sealing or tissue fusion is the buildup of eschar on the surgical instrument. Eschar is a deposit which is created from tissue that is charred by heat. Surgical tools often lose effectiveness when coated with eschar.

Conventional electrosurgical systems have employed temperature sensors in the surgical tool to monitor conditions at the operative site and/or the temperature of the tissue being manipulated. An exemplary temperature sensor used in such systems is a thermocouple due to its small size and low cost. However, thermocouples alone are not accurate and required compensation circuitry to achieve a desired level of accuracy.

Therefore, it would be desirable to have a temperature measurement circuit for an electrosurgical system for accurately determining a temperature of an operative site and/or tissue of a patient. Furthermore, it would be desirable to have a temperature measurement circuit for controlling an electrosurgical generator for producing a clinically effective output and, in addition, reducing the amount of heat and thermal spread at the operative site.

SUMMARY

A thermocouple measurement circuit for sensing a temperature at a measuring point is provided. The thermocouple measurement circuit according to embodiments of the present invention employs an instrumentation amplifier for accurately summing a thermocouple voltage with a cold junction compensation offset to produce a voltage proportional to the temperature sensed. Advantageously, the use of an instrumentation amplifier allows common mode and differential filtering to be easily added for various noise conditions.

According to an aspect of the present invention, a thermocouple measurement circuit is provided including a thermocouple input for sensing a temperature at a measuring point, a compensation circuit for compensating thermocouple effects of junctions of the thermocouple, and an instrumentation amplifier for summing an output of the thermocouple and an output of the compensation circuit and outputting a voltage indicative of the temperature sensed, wherein the output of the compensation circuit is a reference voltage for the output of the instrumentation amplifier.

In another aspect of the present invention, an electrosurgical generator is provided including a radio frequency (RF) output circuit for outputting RF energy; a control circuit for controlling the output of the RF output circuit; and a thermocouple measurement circuit for determining a temperature at a measuring point, the thermocouple measuring circuit including a thermocouple input for sensing a temperature at the measuring point, a compensation circuit for compensating thermocouple effects of junctions of the thermocouple, and an instrumentation amplifier for summing an output of the thermocouple and an output of the compensation circuit and outputting a voltage indicative of the temperature sensed to the control circuit.

In a further aspect of the present invention, an electrosurgical system is provided including an electrosurgical generator for outputting radio frequency (RF) energy; an electrosurgical instrument coupled to the electrosurgical generator for applying the RF energy to an operative site; and a thermocouple measurement circuit for determining a temperature at the operative site, the thermocouple measuring circuit comprising a thermocouple input for sensing the temperature at a measuring-point of the electrosurgical instrument, a compensation circuit for compensating thermocouple effects of junctions of the thermocouple, and an instrumentation amplifier for summing an output of the thermocouple and an output of the compensation circuit and outputting a voltage indicative of the temperature sensed to the electrosurgical generator, wherein the electrosurgical generator controls the output energy based on the sensed temperature.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION

Embodiments of the present invention will be described herein below with reference to the accompanying drawings. In the following description, well-known functions or constructions are not described in detail to avoid obscuring the invention in unnecessary detail.

Figure 1:
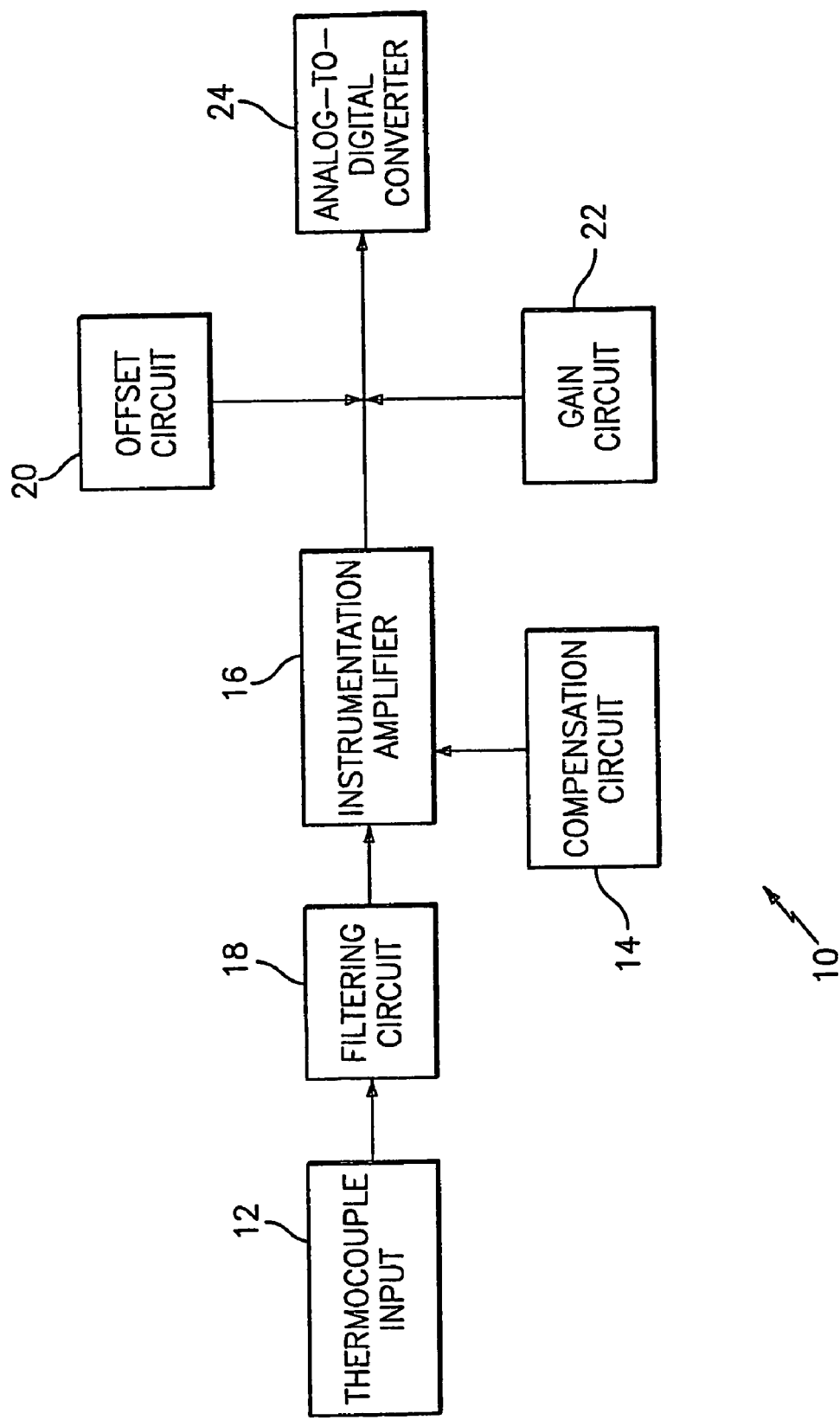
FIG. 1 is a block diagram of a thermocouple measurement circuit in accordance with the present invention.

Referring to FIG. 1, a thermocouple measurement circuit 10 is provided. The thermocouple measurement circuit 10 generally includes a thermocouple input 12 for sensing a temperature of a measuring point, a compensation circuit 14 for compensating thermocouple effects of junctions of the thermocouple 12 and an instrumentation amplifier 16 for summing an output of the thermocouple and an output of the compensation circuit and outputting a voltage indicative of the temperature sensed. The thermocouple measurement circuit 10 may also include a filtering circuit 18 for eliminating noise from the thermocouple input 12 and an offset 20 and gain 22 circuit for scaling an output of the thermocouple measurement circuit 10. Optionally, the thermocouple measurement circuit 10 may include analog-to-digital converter 24 for converting the analog output voltage to a digital signal.

Figure 2:
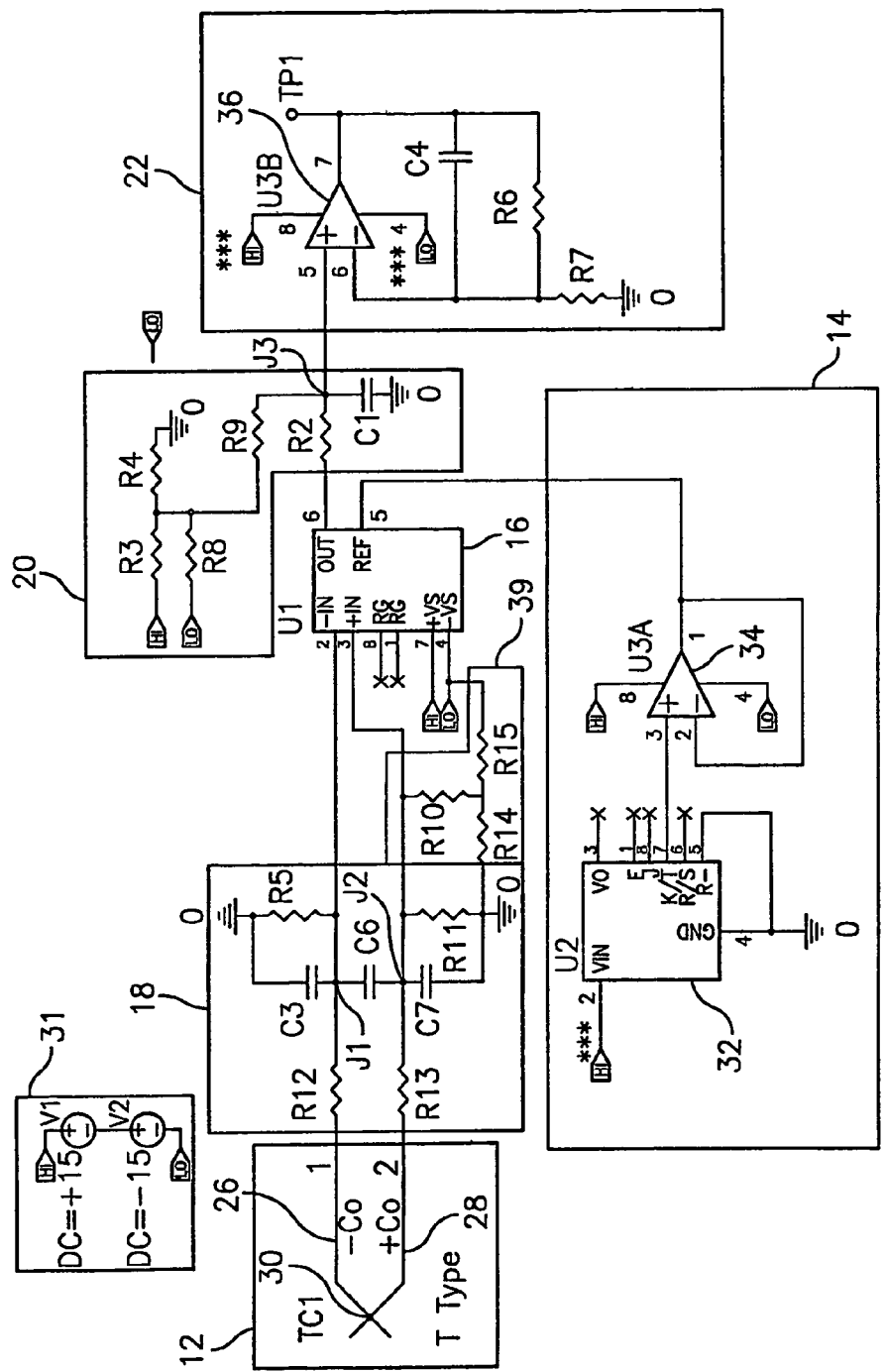
FIG. 2 is a schematic diagram of a thermocouple measurement circuit according to an embodiment of the present invention.

FIG. 2 is a detailed schematic diagram of a thermocouple measurement circuit 25 according to an embodiment of the present invention. Thermocouple input 12 includes two leads 26, 28 which intersect at a junction forming a measuring point 30. The leads 26, 28 are coupled to input terminals −IN, +IN of instrumentation amplifier 16. The instrumentation amplifier includes a reference terminal REF for providing a reference voltage for an output voltage of the instrumentation amplifier 16. An exemplary instrumentation amplifier is Model LT1167 commercially available from Linear Technology Corporation of Milpitas, Calif. The instrumentation amplifier 16 allows for precision amplification of the differential voltage from the thermocouple input while rejecting large values of common mode noise.

A power supply circuit 31 is employed to provide a high voltage output, e.g., +15 VDC, and a low voltage output, e.g., −15 VDC, for energizing any component requiring power in the thermocouple measurement circuit 10.

Compensation circuit 14 provides the reference voltage to the instrumentation amplifier 16. The compensation circuit 14 includes a cold junction compensator 32 for compensating voltages produced at junctions of the thermocouple to the circuit 10. An exemplary cold junction compensator is Model LT1025 commercially available from Linear Technology Corporation of Milpitas, Calif. Since the reference terminal REF of the instrumentation amplifier 16 requires a high impedance input, an output of the cold junction compensator 32 is coupled to an operational amplifier 34 which in turn is coupled to the reference terminal REF of the instrumentation amplifier 16. An exemplary operational amplifier is Model LTC1151 also available from Linear Technology Corporation of Milpitas, Calif. Using the reference terminal REF of the instrumentation amplifier 16 to sum the compensation circuit 14 and thermocouple 12 voltages provides a much more accurate and reliable summing junction. The voltage output OUT from the instrumentation amplifier 16 is proportional to the temperature sensed at the measuring point 30.

It is to be appreciated any standard type of thermocouple, e.g., T, J, K, E, S and R, may be employed by the thermocouple measurement circuit of the present invention by matching the type of thermocouple to the cold junction compensator. For example, since a T type thermocouple is utilized in FIG. 2, the output of the cold junction compensator 32 is taken from the terminal labeled K/T (terminal 7). If a J type thermocouple were to be used, the output from terminal J, e.g., terminal 8, of the cold junction compensator 32 would be coupled to the amplifier 34.

Preferably, the thermocouple input 12 is filtered via filtering circuit 18 to eliminate noise from being introduced to the instrumentation amplifier 16. The filtering circuit 18 includes capacitors C3, C6 and C7 and resistors R5 and R11-R13. Capacitors C3, C6, and C7 are designed as filtering elements to reduce noise. Lead 24 of the thermocouple input 12 is connected to the instrumentation amplifier 16 via resistor R12. Capacitor C3 and resistor R5 are coupled in parallel at one end to a junction J1 of the resistor R12 and the input terminal −IN of the instrumentation amplifier 16 and at the other end to ground. Lead 28 of the thermocouple input 12 is connected to the instrumentation amplifier 16 via resistor R13. Capacitor C7 and resistor R11 are coupled in parallel at one end to a junction J2 of the resistor R13 and the input terminal +IN of the instrumentation amplifier 16 and at the other end to ground. Capacitor C6 is coupled between junction J1 and junction J2. It is to be understood that common mode chokes and/or RF chokes may be employed for filtering the thermocouple input 12.

The output voltage OUT of the instrumentation amplifier 16 may be conditioned by an offset circuit 20 and a gain circuit 22 for scaling the thermocouple measurement circuit 10 due the non-linearity of the thermocouple or for a desired voltage-to-temperature ratio. The offset circuit 20 includes resistor R2 coupled in between the output voltage OUT and junction J3. Capacitor C1 is coupled at one end to junction J3 and at the other to ground. A resistor network including resistors R2, R3, R4, R8 and R9 are coupled to junction J3. It is to be understood resistors R3 and R8 are utilized depending on the voltage offset being employed, e.g., if a positive offset is required, resistor R3 is employed, and, if a negative offset is required, resistor R8 is employed.

The gain circuit 22 includes amplifier 36, capacitor C4 and resistors R6, R7. The gain circuit 22 receives as an input a voltage from junction J3 of the offset circuit 20. This voltage is input to the non-inverting input of the amplifier 36. The gain of the amplifier 36 is set by combination of capacitor C4 and resistors R6, R7 coupled to the inverting input of the amplifier 36. The amplifier 36 outputs an analog voltage proportional to the temperature sensed at the measuring point 28 to connection point TP1.

Optionally, the output voltage at connection point TP1 will be sent to an analog-to-digital converter for converting the analog voltage to a digital signal. The digital signal will be less susceptible to noise and can be utilized in a software program, for example, to control a condition at the measuring point.

Furthermore, an additional offset circuit 39 may be coupled to the input of the instrumentation amplifier to determine if a thermocouple is connected. A small offset voltage will pull the input high or low depending on which terminal of the instrumentation amplifier (+IN or −IN) the offset circuit is connected to. For example, as shown in FIG. 2, a resistor network including R10, R14 and R15 coupled to a DC voltage of the low level, e.g. −15 VDC, is applied to the input terminal +IN of the instrumentation amplifier 16. Pulling the input high or low will then give a temperature reading of very high or very low (e.g., some value out of range) indicating that a thermocouple is not connected or has opened.

Figure 3:
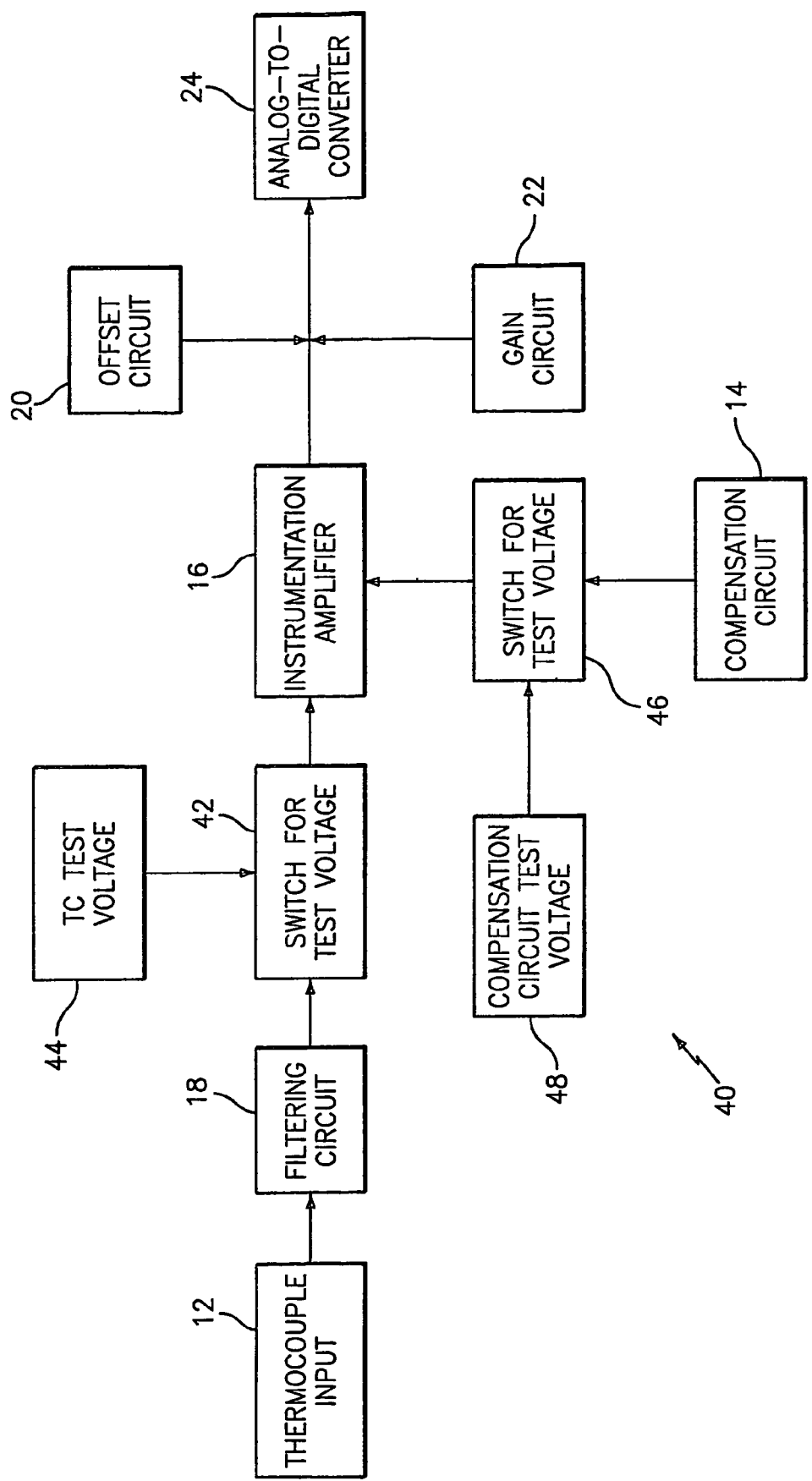
FIG. 3 is a block diagram of a thermocouple measurement circuit including self-test circuitry according to another embodiment of the present invention.

FIG. 3 is a block diagram of a thermocouple measurement circuit including self-test circuitry according to another embodiment of the present invention. The thermocouple measurement circuit 40 operates identically to the thermocouple measurement circuit 10 shown in FIG. 1 but includes additional circuitry for enabling a self-test to be performed. Depending on the type of thermocouple being used, the voltage output of the thermocouple measurement circuit is readily ascertained from the temperature at a measuring point. To test the thermocouple measurement circuit 40, a first switch 42 will remove the thermocouple input 12 and filtering circuit 18 from being input to the instrumentation amplifier 16. The first switch 42 couples a thermocouple (TC) test voltage 44 to input terminals −IN and +IN of the instrumentation amplifier 16. A second switch 46 removes the compensation circuit 14 from the reference terminal REF of the instrumentation amplifier 16 and couple a compensation circuit test voltage 48 to the reference terminal REF. The output voltage can be verified at the connection point based on the voltage values input to the instrumentation amplifier 16.

When the thermocouple measurement circuit 40 is determined to be working properly, the first and second switches 42, 46 will return to their normal positions and the circuit 40 will operate as described above in relation to FIGS. 1 and 2.

Figure 4:
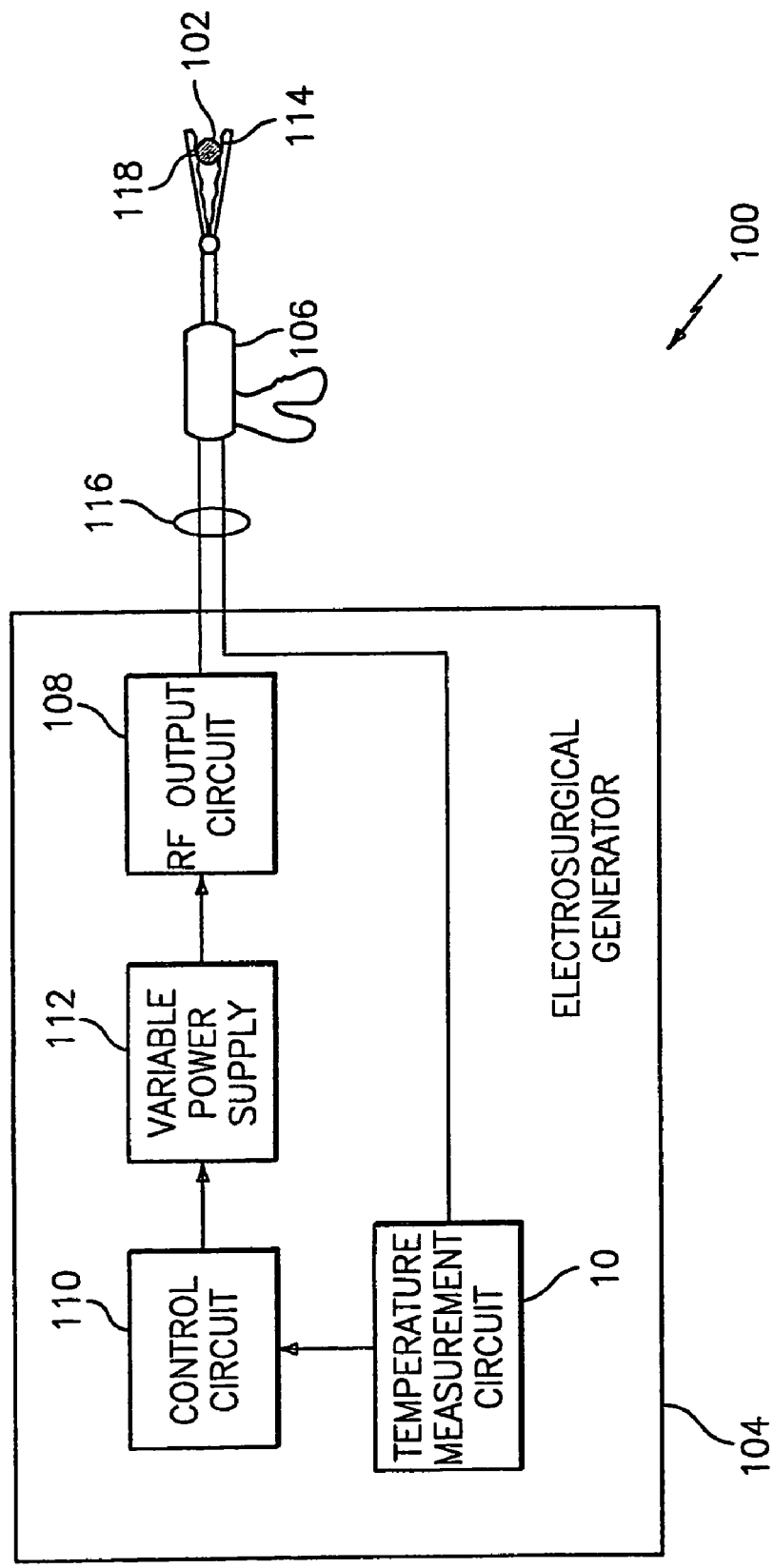
FIG. 4 is an exemplary electrosurgical system employing a thermocouple measurement circuit in accordance with the present invention.

An exemplary electrosurgical system 100 employing a thermocouple measurement circuit in accordance with the present invention is shown in FIG. 4. The system 100 can be used for sealing vessels 102 and other tissues of a patient, including ducts, veins, arteries and vascular tissue. The system 100 includes an electrosurgical generator 104 and a surgical instrument 106. The surgical instrument 106 is illustrated by way of example, and as will become apparent from the discussion below, other instruments can be utilized. The electrosurgical generator 104 includes several interconnected sub-units, including an RF output circuit 108, a power control circuit 110, a variable D.C. power supply 112 and the thermocouple measurement circuit 10. The surgical instrument 106 is electrically connected to the electrosurgical generator 104 via cable 116 for receiving controlled electrosurgical power therefrom. The surgical instrument 106 has some type of end effector member 114, such as a forceps or hemostat, capable of grasping and holding the vessels and tissues of the patient. The member 114, also referred to simply as end effector 114, is assumed, in this embodiment, to be capable of applying and maintaining a relatively constant level of pressure on the vessel 102.

The member 114 is provided in the form of bipolar electrosurgical forceps using two generally opposing electrodes disposed on inner opposing surfaces of the member 114, and which are both electrically coupled to the output of the electrosurgical generator 104. During use, different electric potentials are applied to each electrode. In that tissue is an electrical conductor, when the forceps are utilized to clamp or grasp the vessel 102 therebetween, the electrical energy output from the electrosurgical generator 104 is transferred through the intervening tissue. Both open surgical procedures and endoscopic surgical procedures can be performed with suitably adapted surgical instruments 106. It should also be noted that the member 114 could be monopolar forceps that utilizes one active electrode, with the other (return) electrode or pad being attached externally to the patient, or a combination of bipolar and monopolar forceps.

A measuring point 118 of a thermocouple input is preferably located in member 114 to measure the temperature of the patient tissue or of the operative site. The thermocouple is coupled to the thermocouple measurement circuit 10 via cable 116. An output voltage indicative of the temperature at measuring point 118 is sent to the control circuit 110 for controlling the output power of the electrosurgical generator 104.

It is to be appreciated that output power from the electrosurgical generator can be adjusted in several ways. For example, the amplitude of the output power can be adjusted. In another example, the output power can be adjusted by changing the duty cycle or the crest factor.

In another embodiment, it is contemplated that the control circuit 110 controls a module for producing resistive heat for regulating heat applied to the tissue for achieving a desired tissue effect instead of or in addition to controlling the electrosurgical output circuit 108 and/or the power supply 112. The control circuit 110 responds to sensed tissue temperature indicative of tissue temperature and outputs a command signal for controlling output heat resistivity. Preferably, the module for producing resistive heat includes a current source and/or a variable resistor which are responsive to the command signal for outputting a desired current or providing a desired resistance, respectively.

A thermocouple measurement circuit for sensing a temperature at a measuring point has been described. The thermocouple measurement circuit according to embodiments of the present invention employs an instrumentation amplifier for accurately summing a thermocouple voltage with a cold junction compensation offset to produce a voltage proportional to the temperature sensed. The use of an instrumentation amplifier allows common mode and differential filtering to be easily added for various noise conditions. Various embodiments of the thermocouple measurement circuit may be employed in electrosurgical generators for controlling output power dependent on temperature conditions.

While several embodiments of the disclosure have been shown in the drawings, it is not intended that the disclosure be limited thereto, as it is intended that the disclosures be as broad in scope as the art will allow and that the specification be read likewise. Therefore, the above description should not be construed as limiting, but merely as exemplifications of preferred embodiments.

What is claimed is:

1. A thermocouple measurement circuit comprising:
   a thermocouple input for sensing a temperature at a measuring point;
   a compensation circuit for compensating thermocouple effects of junctions of the thermocouple;
   an instrumentation amplifier for summing an output of the thermocouple and an output of the compensation circuit and outputting a voltage indicative of the temperature sensed;
   a first switch coupled between the thermocouple input and the instrumentation amplifier for supplying a thermocouple test voltage to the instrumentation amplifier during a test mode; and
   a second switch coupled between the compensation circuit and the instrumentation amplifier for supplying a compensation test voltage to the instrumentation amplifier during the test mode.

2. The thermocouple measurement circuit of claim 1, wherein the output of the compensation circuit is a reference voltage for the output of the instrumentation amplifier.

3. The thermocouple measurement circuit as in claim 1, wherein the compensation circuit is a cold junction compensator.

4. The thermocouple measurement circuit as in claim 3, wherein the compensation circuit further includes an amplifier coupled to the cold junction compensator for outputting a high impedance output from the compensation circuit.

5. The thermocouple measurement circuit as claim 1, further comprising a filtering circuit for eliminating noise from the thermocouple input.

6. The thermocouple measurement circuit as claim 1, further comprising an analog-to-digital converter for converting the output voltage to a digital signal.

7. The thermocouple measurement circuit as claim 1, further comprising an offset circuit coupled to the thermocouple input for generating an out of range thermocouple output when the thermocouple input is not connected.

8. An electrosurgical generator comprising:
a radio frequency (RF) output circuit for outputting RF energy;
a control circuit for controlling the output of the RF output circuit; and
a thermocouple measurement circuit for determining a temperature at a measuring point, the thermocouple measuring circuit comprising:
a thermocouple input for sensing a temperature at the measuring point;
a compensation circuit for compensating thermocouple effects of junctions of the thermocouple;
an instrumentation amplifier for summing an output of the thermocouple and an output of the compensation circuit and outputting a voltage indicative of the temperature sensed to the control circuit;
a first switch coupled between the thermocouple input and the instrumentation amplifier for supplying a thermocouple test voltage to the instrumentation amplifier during a test mode; and
a second switch coupled between the compensation circuit and the instrumentation amplifier for supplying a compensation test voltage to the instrumentation amplifier during the test mode.

9. The electrosurgical generator as in claim 8, wherein the output of the compensation circuit is a reference voltage for the output of the instrumentation amplifier.

10. The electrosurgical generator as in claim 8, wherein the compensation circuit is a cold junction compensator.

11. The electrosurgical generator as in claim 10, wherein the compensation circuit further includes an amplifier coupled to the cold junction compensator for outputting a high impedance output from the compensation circuit.

12. The electrosurgical generator as in claim 8, further comprising a filtering circuit for eliminating noise from the thermocouple input.

13. The electrosurgical generator as in claim 8, further comprising an analog-to-digital converter for converting the output voltage to a digital signal.

14. The electrosurgical generator as in claim 8, further comprising an offset circuit coupled to the thermocouple input for generating an out of range thermocouple output when the thermocouple input is not connected.

* * * * *